(12) United States Patent
  Smith

(10) Patent No.: US 10,315,552 B1
(45) Date of Patent: Jun. 11, 2019

(54) DEBRIS RETAINMENT ASSEMBLY

(71) Applicant: Brian Smith, Hoffman Estates, IL (US)

(72) Inventor: Brian Smith, Hoffman Estates, IL (US)

( * ) Notice: Subject to any disclaimer, the term of this patent is extended or adjusted under 35 U.S.C. 154(b) by 30 days.

(21) Appl. No.: 15/839,948

(22) Filed: Dec. 13, 2017

(51) Int. Cl.
  *B60P 1/28* (2006.01)
  *B60R 13/01* (2006.01)
  *B60R 9/06* (2006.01)
  *B60P 1/26* (2006.01)

(52) U.S. Cl.
  CPC ............... *B60P 1/283* (2013.01); *B60P 1/26* (2013.01); *B60P 1/28* (2013.01); *B60R 9/06* (2013.01); *B60R 13/01* (2013.01)

(58) Field of Classification Search
  CPC .... B60P 1/26; B60P 1/28; B60P 1/283; B60P 7/04; B60R 9/06; B60R 13/01
  USPC .......................................... 296/38, 50, 183.2
  See application file for complete search history.

(56) References Cited

U.S. PATENT DOCUMENTS

| 4,772,072 | A | 9/1988 | Vick, Jr. |
| 5,046,774 | A | 9/1991 | Stockell et al. |
| 7,731,297 | B1* | 6/2010 | Ozanich ............... B60P 1/283 298/23 MD |
| D669,839 | S | 10/2012 | Valenta et al. |
| 8,491,031 | B1 | 7/2013 | Brown |
| 8,998,285 | B2 | 4/2015 | Bethel |
| 9,387,815 | B2 | 7/2016 | Goldstein et al. |
| 9,834,156 | B2* | 12/2017 | Goldstein ............ B60R 13/01 |
| 2012/0007382 | A1 | 1/2012 | Keck et al. |

* cited by examiner

*Primary Examiner* — Jason S Daniels

(57) ABSTRACT

A debris retainment assembly for a vehicle includes a pair of rods, a first cord, a second cord, and a mesh. The first cord, the second cord, and the mesh are resilient. The first cord and the second cord are coupled to and extend between the rods. The mesh is coupled to and extends between the first cord, the second cord, and the rods. A plurality of first couplers is coupled to the first cord. Each of a plurality of second couplers is coupled to a respective rod. The first couplers and the second couplers are configured to couple to a tailgate and opposing sides of the vehicle, respectively, to position the mesh over a gap in the vehicle. The mesh is configured to allow air to pass through the mesh and to retain debris in the vehicle.

14 Claims, 4 Drawing Sheets

DEBRIS RETAINMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

(2) Description of Related Art including information disclosed under 37 CFR 1.97 and 1.98.

The disclosure and prior art relates to retainment assemblies and more particularly pertains to a new retainment assembly for a vehicle.

BRIEF SUMMARY OF THE INVENTION

An embodiment of the disclosure meets the needs presented above by generally comprising a pair of rods, a first cord, a second cord, and a mesh. The first cord, the second cord, and the mesh are resilient. The first cord and the second cord are coupled to and extend between the rods. The mesh is coupled to and extends between the first cord, the second cord, and the rods. A plurality of first couplers is coupled to the first cord. Each of a plurality of second couplers is coupled to a respective rod. The first couplers and the second couplers are configured to couple to a tailgate and opposing sides of the vehicle, respectively, to position the mesh over a gap in the vehicle. The mesh is configured to allow air to pass through the mesh and to retain debris in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
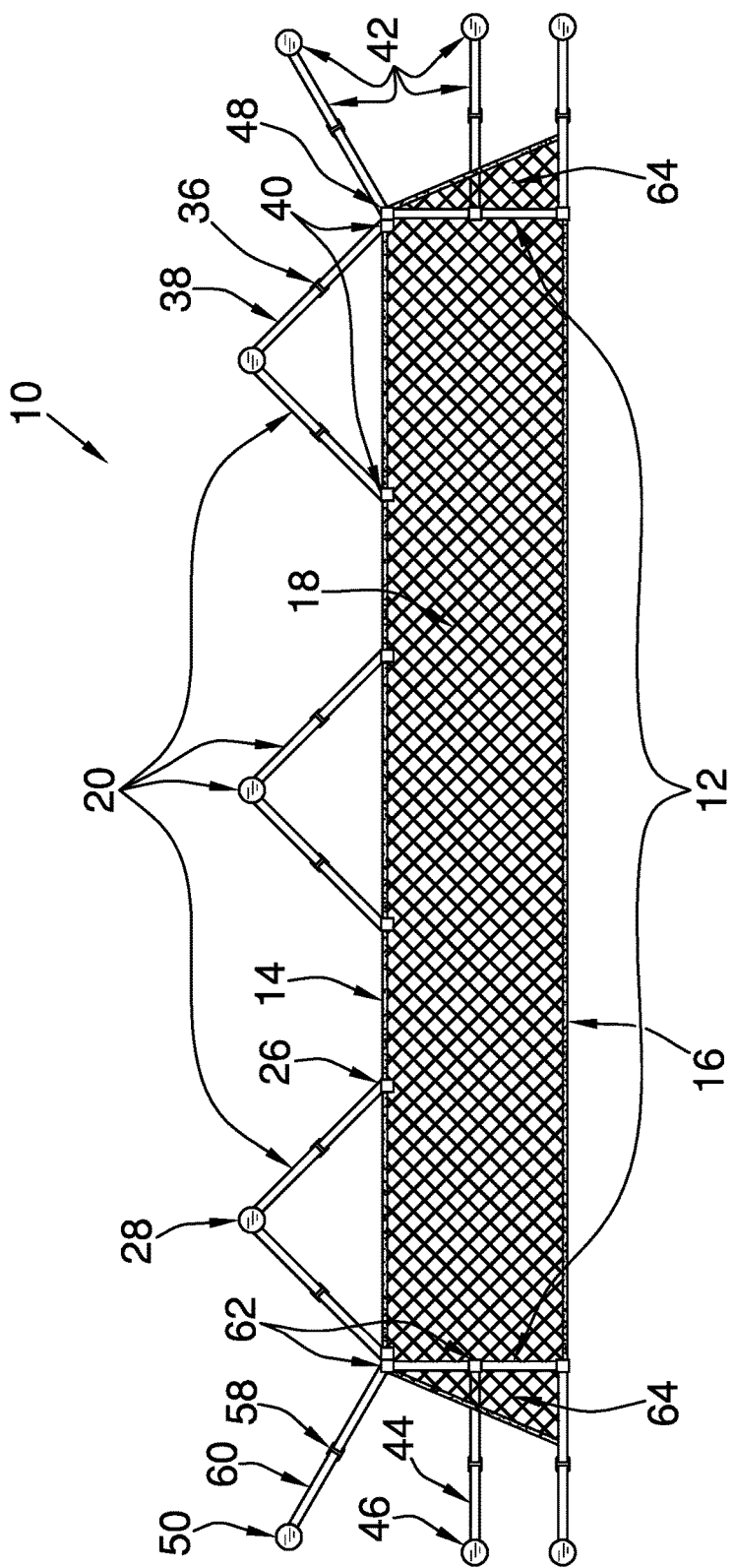
FIG. 1 is a front view of a debris retainment assembly according to an embodiment of the disclosure.
Figure 2:
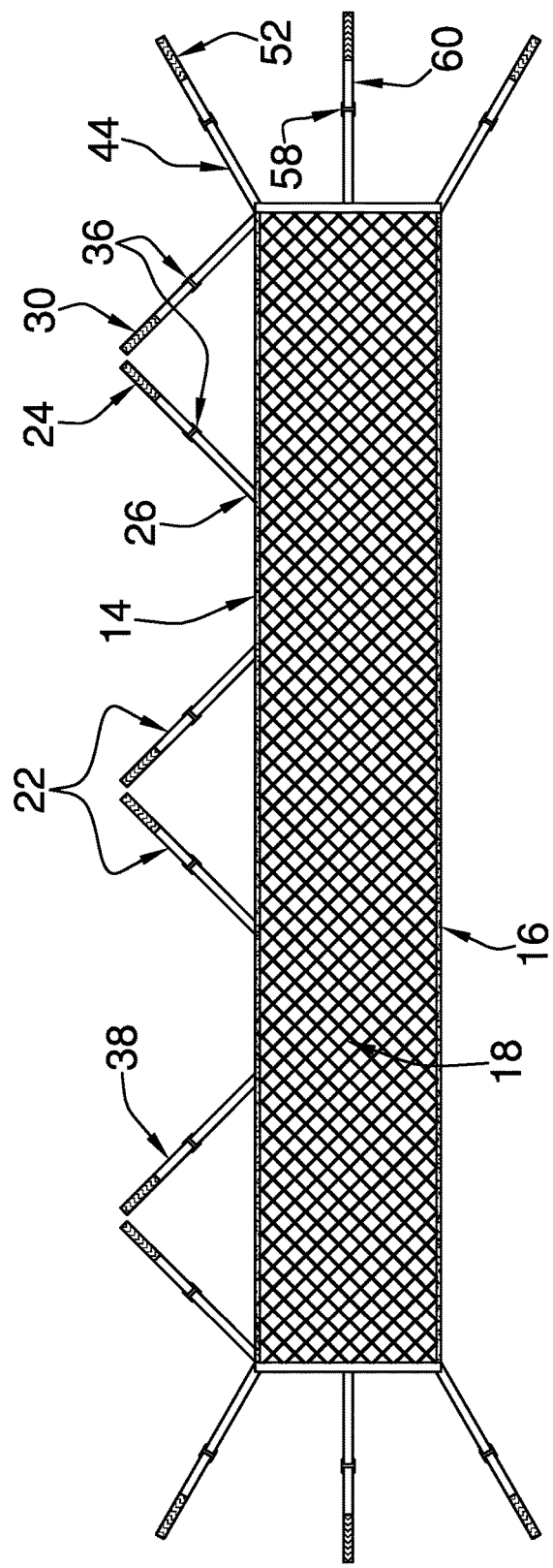
FIG. 2 is a rear view of an embodiment of the disclosure.
Figure 3:
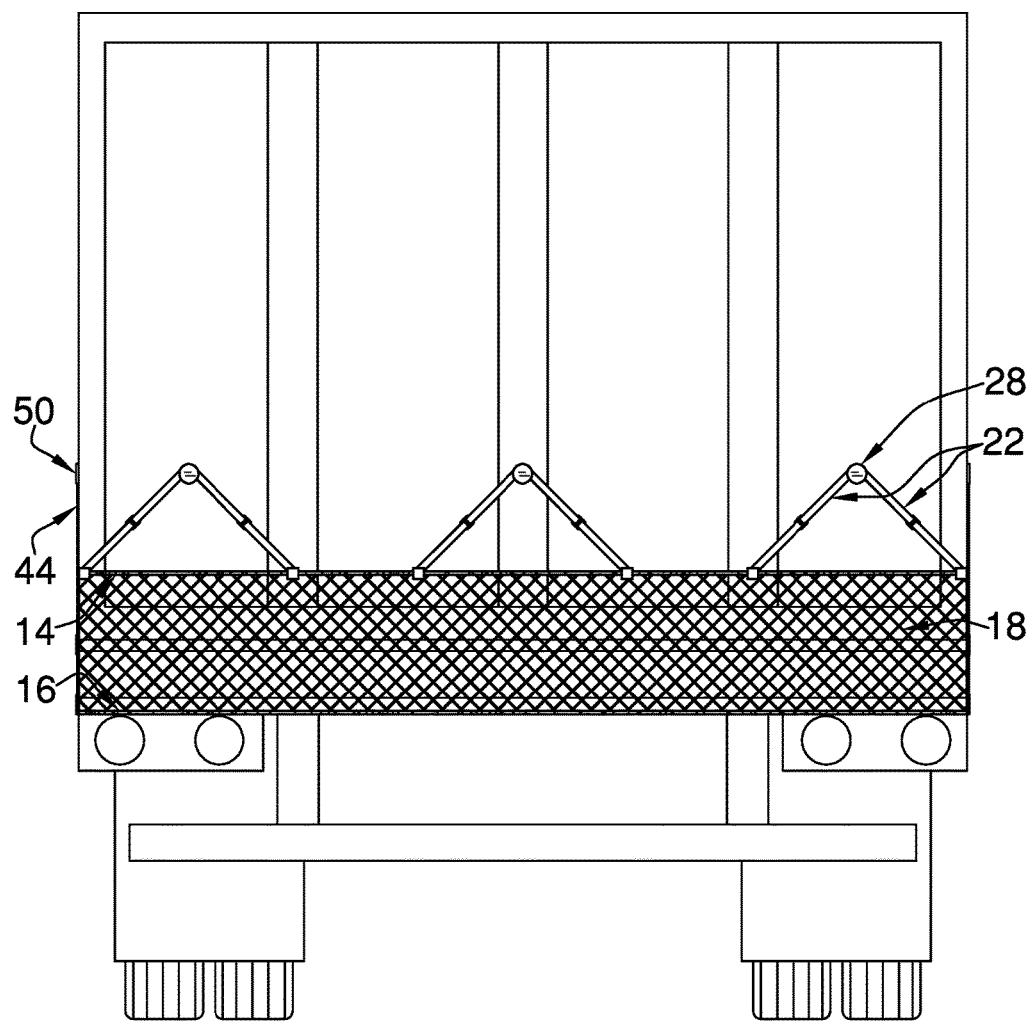
FIG. 3 is an in-use view of an embodiment of the disclosure.
Figure 4:
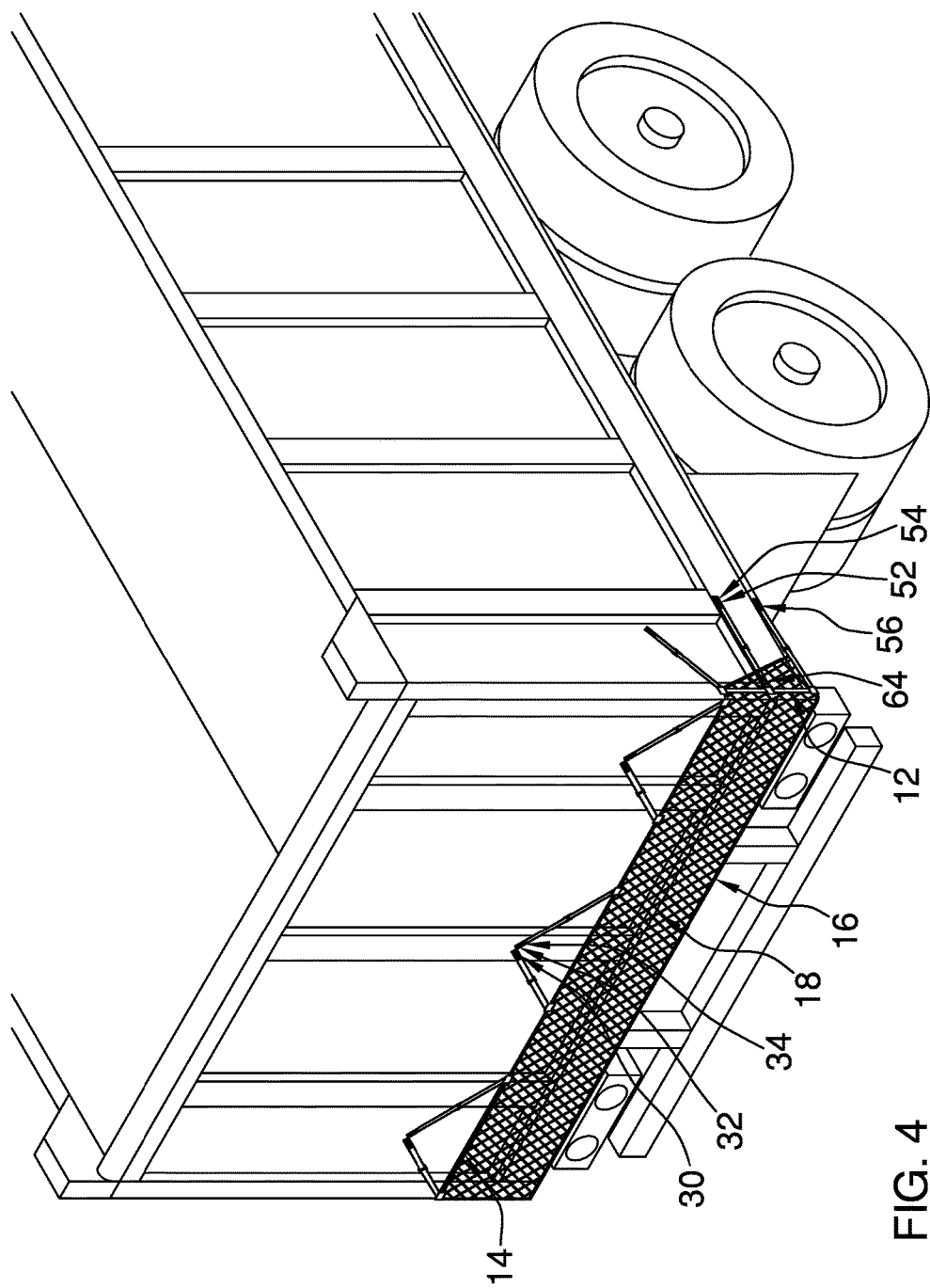
FIG. 4 is an in-use view of an embodiment of the disclosure.

With reference now to the drawings, and in particular to FIGS. 1 through 4 thereof, a new retainment assembly embodying the principles and concepts of an embodiment of the disclosure and generally designated by the reference numeral 10 will be described.

As best illustrated in FIGS. 1 through 4, the debris retainment assembly 10 generally comprises a pair of rods 12, a first cord 14, a second cord 16, and a mesh 18. The first cord 14, the second cord 16, and the mesh 18 are resilient. The first cord 14 and the second cord 16 are coupled to and extend between the rods 12. The rods 12, the first cord 14, and the second cord 16 are rectangularly positioned. The mesh 18 is coupled to and extends between the first cord 14, the second cord 16, and the rods 12. The mesh 18 is configured to allow air to pass through the mesh 18 and to retain debris that contacts the mesh 18.

A plurality of first couplers 20 is coupled to the first cord 14. The first couplers 20 are configured to couple to a tailgate of a vehicle, such as a dump truck, to couple the first cord 14 to the vehicle. In one embodiment, the plurality of first couplers 20 comprises three first couplers 20 that are substantially evenly spaced on the first cord 14. In another embodiment, each first coupler 20 comprises a pair of first straps 22 and a first connector 24. Each first strap 22 has a first end 26 that is coupled to the first cord 14. Each first strap 22 is coupled to an associated first connector 24 distal from the first end 26 so that that each first connector 24 is configured to couple an associated pair of first straps 22 to the tailgate to couple the first cord 14 to the vehicle.

In one embodiment, each first connector 24 comprises a first magnet 28. In another embodiment, each first connector 24 comprises a first fastener 30 and a second fastener 32. Each first fastener 30 is coupled to a respective first strap 22. The second fasteners 32 are coupled to the tailgate. Each second fastener 32 is positioned to couple to a respective first fastener 30 to couple the first cord 14 to the tailgate. In yet another embodiment, each first fastener 30 and the respective second fastener 32 comprise a first hook and loop fastener 34.

Each of a plurality of first buckles 36 is coupled to a respective first strap 22 between the first end 26 and the first connector 24. The respective first strap 22 is couplable to the first buckle 36 to form a first loop 38 so that the respective first strap 22 is length-adjustable.

Each of a plurality of first clips 40 is coupled to the first end 26 of a respective first strap 22. The first clips 40 are configured to couple to the first cord 14. The first clips 40 are positioned on the first straps 22 so that each first clip 40 is positioned to couple the respective first strap 22 to the first cord 14.

Each of a plurality of second couplers 42 is coupled to a respective rod 12. Each second coupler 42 is configured to couple to a respective opposing side of the vehicle to couple the rods 12 to the vehicle. The mesh 18 is positioned over a gap in the vehicle, such as a gap defined by the tailgate and the bed of the dump truck. The debris that is positioned in the vehicle is retained in the vehicle.

In one embodiment, the plurality of second couplers 42 comprises six second couplers 42 that are positioned three apiece on each rod 12. The second couplers 42 are substantially evenly spaced on the rod 12. In another embodiment, each second coupler 42 comprises a second strap 44 and a second connector 46. The second strap 44 has a first terminus 48 that is coupled to the rod 12. The second strap 44 is coupled to the second connector 46 distal from the first terminus 48. Each second connector 46 is configured to couple an associated second strap 44 to the respective opposing side of the vehicle to couple the rod 12 to the vehicle.

In one embodiment, each second connector 46 comprises a second magnet 50. In another embodiment, each second connector 46 comprises a third fastener 52 and a fourth fastener 54. Each third fastener 52 is coupled to a respective second strap 44. Each fourth fastener 54 is coupled to a respective opposing side of the vehicle. Each fourth fastener 54 is positioned to couple to a respective third fastener 52 to couple the rods 12 to the vehicle. In yet another embodiment, each third fastener 52 and the respective fourth fastener 54 comprise a second hook and loop fastener 56.

Each of a plurality of second buckles 58 is coupled to a respective second strap 44 between the first terminus 48 and the second connector 46. The respective second strap 44 is couplable to the second buckle 58 to form a second loop 60 so that the respective second strap 44 is length-adjustable.

Each of a plurality of second clips 62 is coupled to the first terminus 48 of a respective second strap 44. The second clips 62 are configured to couple to a respective rod 12. Each second clip 62 is positioned to couple the respective second strap 44 to the respective rod 12.

Each of a pair of flaps 64 is coupled to and extends from a respective rod 12. The flaps 64 are meshed. Each flap 64 is coupled to at least one second strap 44 distal from the respective rod 12 so that the flap 64 is configured to position over a void, such as a void defined by the tailgate and a side panel of the dump truck. The debris that is positioned in the vehicle is retained in the vehicle. In one embodiment, the flaps 64 are substantially triangularly shaped.

In use, the first clips 40 are positioned to couple the first straps 22 to the first cord 14. The second clips 62 are positioned to couple the second straps 44 to the rods 12. The first magnets 28 are configured to couple the pairs of first straps 22 to the tailgate to couple the first cord 14 to the vehicle. The second magnets 50 are configured to couple the second straps 44 to the opposing sides of the vehicle to couple the rod 12 to the vehicle. The mesh 18 is positioned over the gap in the vehicle. The mesh 18 is configured to allow air to pass through the mesh 18 and to retain the debris that contacts the mesh 18. The flaps 64 are configured to position over the voids in the vehicle. The debris that is positioned in the vehicle is retained in the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A debris retainment assembly comprising:
a pair of rods;
a first cord and a second cord, said first cord and said second cord being resilient, said first cord and said second cord being coupled to and extending between said rods such that said rods, said first cord, and said second cord are rectangularly positioned;
a mesh coupled to and extending between said first cord, said second cord, and said rods, said mesh being resilient;
a plurality of first couplers coupled to said first cord, said first couplers being configured for coupling to a tailgate of a vehicle, such as a dump truck, for coupling said first cord to the vehicle;
a plurality of second couplers, each said second coupler being coupled to a respective said rod, each said second coupler being configured for coupling to a respective opposing side of the vehicle for coupling said rods to the vehicle; and
wherein said mesh is positioned on said first cord, said second cord, and said rods, such that said mesh is configured for passing of air through said mesh and for retaining debris contacting said mesh, wherein said first couplers are positioned on said first cord such that each said first coupler is configured for coupling to the tailgate of the vehicle for coupling said first cord to the vehicle, wherein said second couplers are positioned on said rod such that each said second coupler is configured for coupling to the respective opposing side of the vehicle for coupling said rods to the vehicle such that said mesh is positioned over a gap in the vehicle, such as a gap defined by the tailgate and the bed of the dump truck, such that the debris positioned in the vehicle is retained in the vehicle.

2. The assembly of claim 1, further including said plurality of first couplers comprising three said first couplers substantially evenly spaced on said first cord.

3. The assembly of claim 1, further including each said first coupler comprising:
a pair of first straps, each said first strap having a first end coupled to said first cord;
a first connector, each said first strap being coupled to an associated said first connector distal from said first end, wherein said first connectors are positioned on said first straps such that each said first connector is configured for coupling an associated said pair of first straps to the tailgate for coupling said first cord to the vehicle.

4. The assembly of claim 1, further including said plurality of second couplers comprising six said second couplers positioned three apiece on each said rod, said second couplers being substantially evenly spaced on said rod.

5. The assembly of claim 3, further including each said second coupler comprising:
a second strap, said second strap having a first terminus coupled to said rod,
a second connector, said second strap being coupled to said second connector distal from said first terminus; and
wherein said second connectors are positioned on said second straps such that each said second connector is configured for coupling an associated said second strap to the respective opposing side of the vehicle for coupling said rod to the vehicle.

6. The assembly of claim 5, further comprising:
each said first connector comprising a first magnet; and
each said second connector comprising a second magnet.

7. The assembly of claim 5, further comprising:
a plurality of first buckles, each said first buckle being coupled to a respective said first strap between said first end and said first connector, said respective said first strap being couplable to said first buckle for forming a first loop such that said respective said first strap is length-adjustable; and
a plurality of second buckles, each said second buckle being coupled to a respective said second strap between said first terminus and said second connector, said respective said second strap being couplable to said second buckle for forming a second loop such that said respective said second strap is length-adjustable.

8. The assembly of claim 5, further comprising:
a plurality of first clips, each said first clip being coupled to said first end of a respective said first strap, said first clips being configured for coupling to said first cord;
a plurality of second clips, each said second clip being coupled to said first terminus of a respective said second strap, said second clips being configured for coupling to a respective said rod; and
wherein said first clips are positioned on said first straps such that each said first clip is positioned for coupling said respective said first strap to said first cord, wherein said second clips are positioned on said second straps such that each said second clip is positioned for coupling said respective said second strap to said respective said rod.

9. The assembly of claim 5, further including a pair of flaps, said flaps being meshed, each said flap being coupled to and extending from a respective said rod, said flap being coupled to at least one said second strap distal from said respective said rod, wherein said flaps are positioned on said rods and said at least one said second strap such that each said flap is configured for positioning over a void, such as a void defined by the tailgate and a side panel of the dump truck, such that the debris positioned in the vehicle is retained in the vehicle.

10. The assembly of claim 9, further including said flaps being substantially triangularly shaped.

11. The assembly of claim 5, further comprising:
each said first connector comprising a first fastener and a second fastener, each said first fastener being coupled to a respective said first strap, said second fasteners being coupled to the tailgate;
each said second connector comprising a third fastener and a fourth fastener, each said third fastener being coupled to a respective said second strap, each said fourth fastener being coupled to a respective opposing side of the vehicle; and
wherein said second fasteners are positioned on the tailgate such that each said second fastener is positioned for coupling to a respective said first fastener for coupling said first cord to the tailgate, wherein said fourth fasteners are positioned on the vehicle such that each said fourth fastener is positioned for coupling to a respective said third fastener for coupling said rods to the vehicle.

12. The assembly of claim 11, further comprising:
each said first fastener and said respective said second fastener comprising a first hook and loop fastener; and
each said third fastener and said respective said fourth fastener comprising a second hook and loop fastener.

13. A debris retainment assembly comprising:
a pair of rods;
a first cord and a second cord, said first cord and said second cord being resilient, said first cord and said second cord being coupled to and extending between said rods such that said rods, said first cord, and said second cord are rectangularly positioned;
a mesh coupled to and extending between said first cord, said second cord, and said rods, said mesh being resilient, wherein said mesh is positioned on said first cord, said second cord, and said rods, such that said mesh is configured for passing of air through said mesh and for retaining debris contacting said mesh;
a plurality of first couplers coupled to said first cord, said first couplers being configured for coupling to a tailgate of a vehicle, such as a dump truck, for coupling said first cord to the vehicle, wherein said first couplers are positioned on said first cord such that each said first coupler is configured for coupling to the tailgate of the vehicle for coupling said first cord to the vehicle, said plurality of first couplers comprising three said first couplers substantially evenly spaced on said first cord, each said first coupler comprising a pair of first straps and a first connector, each said first strap having a first end coupled to said first cord, each said first strap being coupled to an associated said first connector distal from said first end, wherein said first connectors are positioned on said first straps such that each said first connector is configured for coupling an associated said pair of first straps to the tailgate for coupling said first cord to the vehicle, each said first connector comprising a first magnet;
a plurality of first buckles, each said first buckle being coupled to a respective said first strap between said first end and said first connector, said respective said first strap being couplable to said first buckle for forming a first loop such that said respective said first strap is length-adjustable;
a plurality of first clips, each said first clip being coupled to said first end of a respective said first strap, said first clips being configured for coupling to said first cord, wherein said first clips are positioned on said first straps such that each said first clip is positioned for coupling said respective said first strap to said first cord;
a plurality of second couplers, each said second coupler being coupled to a respective said rod, each said second coupler being configured for coupling to a respective opposing side of the vehicle for coupling said rods to the vehicle, wherein said second couplers are positioned on said rod such that each said second coupler is configured for coupling to the respective opposing side of the vehicle for coupling said rods to the vehicle such that said mesh is positioned over a gap in the vehicle, such as a gap defined by the tailgate and the bed of the dump truck, such that the debris positioned in the vehicle is retained in the vehicle, said plurality of second couplers comprising six said second couplers positioned three apiece on each said rod, said second couplers being substantially evenly spaced on said rod, each said second coupler comprising a second strap and a second connector, said second strap having a first terminus coupled to said rod, said second strap being coupled to said second connector distal from said first terminus, wherein said second connectors are positioned on said second straps such that each said second connector is configured for coupling an associated said second strap to the respective opposing side of the vehicle for coupling said rod to the vehicle, each said second connector comprising a second magnet;

a plurality of second buckles, each said second buckle being coupled to a respective said second strap between said first terminus and said second connector, said respective said second strap being couplable to said second buckle for forming a second loop such that said respective said second strap is length-adjustable;

a plurality of second clips, each said second clip being coupled to said first terminus of a respective said second strap, said second clips being configured for coupling to a respective said rod, wherein said second clips are positioned on said second straps such that each said second clip is positioned for coupling said respective said second strap to said respective said rod;

a pair of flaps, said flaps being meshed, each said flap being coupled to and extending from a respective said rod, said flap being coupled to at least one said second strap distal from said respective said rod, wherein said flaps are positioned on said rods and said at least one said second strap such that each said flap is configured for positioning over a void, such as a void defined by the tailgate and a side panel of the dump truck, such that the debris positioned in the vehicle is retained in the vehicle, said flaps being substantially triangularly shaped; and wherein said first clips are positioned on said first straps such that each said first clip is positioned for coupling said respective said first strap to said first cord, wherein said second clips are positioned on said second straps such that each said second clip is positioned for coupling said respective said second strap to said respective said rod, wherein said first magnets are positioned on said first straps such that each said first magnet is configured for coupling an associated said pair of first straps to the tailgate for coupling said first cord to the vehicle, wherein said second magnets are positioned on said second straps such that each said second magnet is configured for coupling an associated said second strap to the respective opposing side of the vehicle for coupling said rod to the vehicle, such that said mesh is positioned over the gap in the vehicle, wherein said mesh is positioned on said first cord, said second cord, and said rods, such that said mesh is configured for passing of air through said mesh and for retaining the debris contacting said mesh, wherein said flaps are positioned on said rods and said at least one said second strap such that each said flap is configured for positioning over the void in the vehicle such that the debris positioned in the vehicle is retained in the vehicle.

14. The assembly of claim 13, further comprising:

each said first connector comprising a first fastener and a second fastener, each said first fastener being coupled to a respective said first strap, said second fasteners being coupled to the tailgate, wherein said second fasteners are positioned on the tailgate such that each said second fastener is positioned for coupling to a respective said first fastener for coupling said first cord to the tailgate, each said first fastener and said respective said second fastener comprising a first hook and loop fastener;

each said second connector comprising a third fastener and a fourth fastener, each said third fastener being coupled to a respective said second strap, each said fourth fastener being coupled to a respective opposing side of the vehicle, wherein said fourth fasteners are positioned on the vehicle such that each said fourth fastener is positioned for coupling to a respective said third fastener for coupling said rods to the vehicle, each said third fastener and said respective said fourth fastener comprising a second hook and loop fastener; and wherein said second fasteners are positioned on the tailgate such that each said second fastener is positioned for coupling to said respective said first fastener for coupling said first cord to the tailgate, wherein said fourth fasteners are positioned on the vehicle such that each said fourth fastener is positioned for coupling to said respective said third fastener for coupling said rods to the vehicle.

\* \* \* \* \*